(12) United States Patent
Polimeni

(10) Patent No.: US 7,761,429 B2
(45) Date of Patent: Jul. 20, 2010

(54) ARCHIVING MESSAGES FROM MESSAGING ACCOUNTS

(75) Inventor: Joseph C. Polimeni, Parkland, FL (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 11/696,234

(22) Filed: Apr. 4, 2007

(65) Prior Publication Data

US 2008/0250084 A1 Oct. 9, 2008

(51) Int. Cl.
*G06F 17/30* (2006.01)
(52) U.S. Cl. ..................... 707/668; 709/206
(58) Field of Classification Search ............ None
See application file for complete search history.

(56) References Cited

U.S. PATENT DOCUMENTS

| | | | |
|---|---|---|---|
| 6,564,251 | B2 | 5/2003 | Katariya et al. |
| 6,609,138 | B1 | 8/2003 | Merriam |
| 6,944,815 | B2 | 9/2005 | Bierbrauer et al. |
| 7,016,938 | B1 | 3/2006 | Quine |
| 7,218,926 | B2 * | 5/2007 | Bocking et al. ............. 455/419 |
| 2002/0147734 | A1 | 10/2002 | Shoup et al. |
| 2004/0221048 | A1 | 11/2004 | Ogier |
| 2004/0249934 | A1 * | 12/2004 | Anderson et al. ........... 709/224 |
| 2005/0102348 | A1 | 5/2005 | Parsons et al. |
| 2005/0102368 | A1 | 5/2005 | Forman et al. |
| 2005/0289016 | A1 | 12/2005 | Horstmann et al. |
| 2006/0010213 | A1 * | 1/2006 | Mehta ....................... 709/206 |
| 2006/0020674 | A1 | 1/2006 | Bruce et al. |
| 2006/0031350 | A1 | 2/2006 | Levi et al. |
| 2006/0031357 | A1 | 2/2006 | Misra et al. |
| 2006/0206451 | A1 | 9/2006 | Brown et al. |
| 2006/0218233 | A1 | 9/2006 | Greve et al. |
| 2007/0027965 | A1 * | 2/2007 | Brenes et al. .............. 709/220 |
| 2008/0028028 | A1 * | 1/2008 | Chismark ................... 709/206 |
| 2008/0162364 | A1 * | 7/2008 | Martin et al. ................ 705/75 |

OTHER PUBLICATIONS

Microsoft Office Outlook 2003 Step by Step, Published by Microsoft Press, Copyright 2004.*
Apache Tutorial: .htaccess files, http://web.archive.org/web/20050726001456/http://httpd.apache.org/docs/2.0/howto/htaccess.html , Published 2005.*
Charlie Russel; Robert Cordingley, Special Edition Using Microsoft Office Outlook 2003, Published Sep. 25, 2003-Chapter 24, particularly Automatically Archiving Outlook Items.*
Julie C. Meloni, Blogging in a Snap, Published Nov. 22, 2005-Chapter 2 Section 12.*

(Continued)

*Primary Examiner*—Neveen Abel Jalil
*Assistant Examiner*—Kevin Young
(74) *Attorney, Agent, or Firm*—Jon A. Gibbons; Fleit Gibbons Gutman Bongini & Bianco P.L.

(57) ABSTRACT

A method, information processing system, and computer readable medium that for archiving messages. The method includes querying a set of messaging accounts associated with a user. A set of archiving configuration messages residing within at least one messaging account in the set of messaging accounts is identified in response to the querying. Each archiving configuration message comprises separate and distinct archiving instructions for the messaging account. At least one message in the messaging account is archived based on an archiving configuration message associated with the message in the set of archiving configuration messages.

16 Claims, 9 Drawing Sheets

OTHER PUBLICATIONS

J. Perkiö, et al., "Multi-Faceted Information Retrieval System for Large Scale Email Archives," *Proceedings of the 2005 IEEE/WIC/ACM International Conference on Web Intelligence (WI'05)*, 0-7695-2415-X/05, 2005 IEEE, 8 pages.

Y. Li, et al., "Securing Email Archives through User Modeling," *Proceedings of the 21st Annual Computer Security Applications Conference (ACSAC 2005)*, 1063-9527/05, 2005 IEEE, 10 pages.

* cited by examiner

226

Archiving Configuration Message

| | |
|---|---|
| To: | |
| From: | ☐ — 202 |
| Subject: | ☐ — 204 |
| Signature: | ☐ — 206 |
| Select: | ☐ — 208 |
| Action: | ☐ — 210 |
| Duration: | ☐ — 212 |
| Propagate: | ☐ — 214 |
| Override: | ☐ — 216 |

FIG. 2

ARCHIVING MESSAGES FROM MESSAGING ACCOUNTS

FIELD OF THE INVENTION

The present invention generally relates to the field of archiving systems, and more particularly relates to archiving messages in messaging accounts.

BACKGROUND OF THE INVENTION

With the advent of free and low cost email services, many users now have multiple email accounts. In the past, business and personal accounts were usually separate, but now many users have multiple email accounts for personal use. These accounts may differ based on the security afforded to each account. For example, an email account that is very secure might be used for financial accounts, while another less secure account might be used to receive marketing information and the target of spam. Using multiple accounts in this way can mitigate security risks, but this method creates problems with archiving and searching for past information. The user may not remember what email was used for a particular purpose at the time, or the email account may not be used at all.

Additionally, the current email trend emphasize web-based email services that are accessible anywhere with any browser such as those available from Google, Yahoo, Microsoft and others. The client does is not required to have access to a local storage to persistently store email message. However, with web-based email services, users are left without an archive solution. Further, even with personal storage files, the user has no way to perform a search on all the email accounts. Each personal storage file must be opened and searched.

Therefore a need exists to overcome the problems with the prior art as discussed above.

SUMMARY OF THE INVENTION

Briefly, in accordance with an embodiment of the present invention, disclosed is a method, information processing system, and computer readable medium for archiving messages. The method includes querying a set of messaging accounts associated with a user. A set of archiving configuration messages residing within at least one messaging account in the set of messaging accounts is identified in response to the querying. Each archiving configuration message comprises separate and distinct archiving instructions for the messaging account. At least one message in the messaging account is archived based on an archiving configuration message associated with the message in the set of archiving configuration messages.

An information processing system for archiving messages. The information processing system includes a memory and a processor that is communicatively coupled to the memory. The information processing system also includes an archiving manager that is communicatively coupled to the memory and the processor. The archiving manager is adapted to querying a set of messaging accounts associated with a user. A set of archiving configuration messages residing within at least one messaging account in the set of messaging accounts is identified in response to the querying. Each archiving configuration message comprises separate and distinct archiving instructions for the messaging account. At least one message in the messaging account is archived based on an archiving configuration message associated with the message in the set of archiving configuration messages.

A computer readable medium for archiving messages. The computer readable medium includes instructions for querying a set of messaging accounts associated with a user. A set of archiving configuration messages residing within at least one messaging account in the set of messaging accounts is identified in response to the querying. Each archiving configuration message comprises separate and distinct archiving instructions for the messaging account. At least one message in the messaging account is archived based on an archiving configuration message associated with the message in the set of archiving configuration messages.

An advantage of the foregoing embodiments of the present invention is that a flexible, user-friendly archiving system is provided to users. A user can easily configure the archiving of multiple messaging accounts without the need of an administrator to set an archiving policy and without the messaging interface being altered to include archival configuration information. The present invention is also advantageous because a user can simply send an archiving configuration message to the account(s) that the user wants archived. The archiving configuration message includes archiving instructions, rules, policies, and the like used by an archiving system to perform archiving operations. Many current archiving systems use templates, which are limited to a particular messaging system. However, with the present invention a user does not need to specify a particular messaging client or service to be archived; any messaging service can be used.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 2 is a block diagram illustrating an exemplary archiving configuration message according to an embodiment of the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Exemplary System

Figure 1:
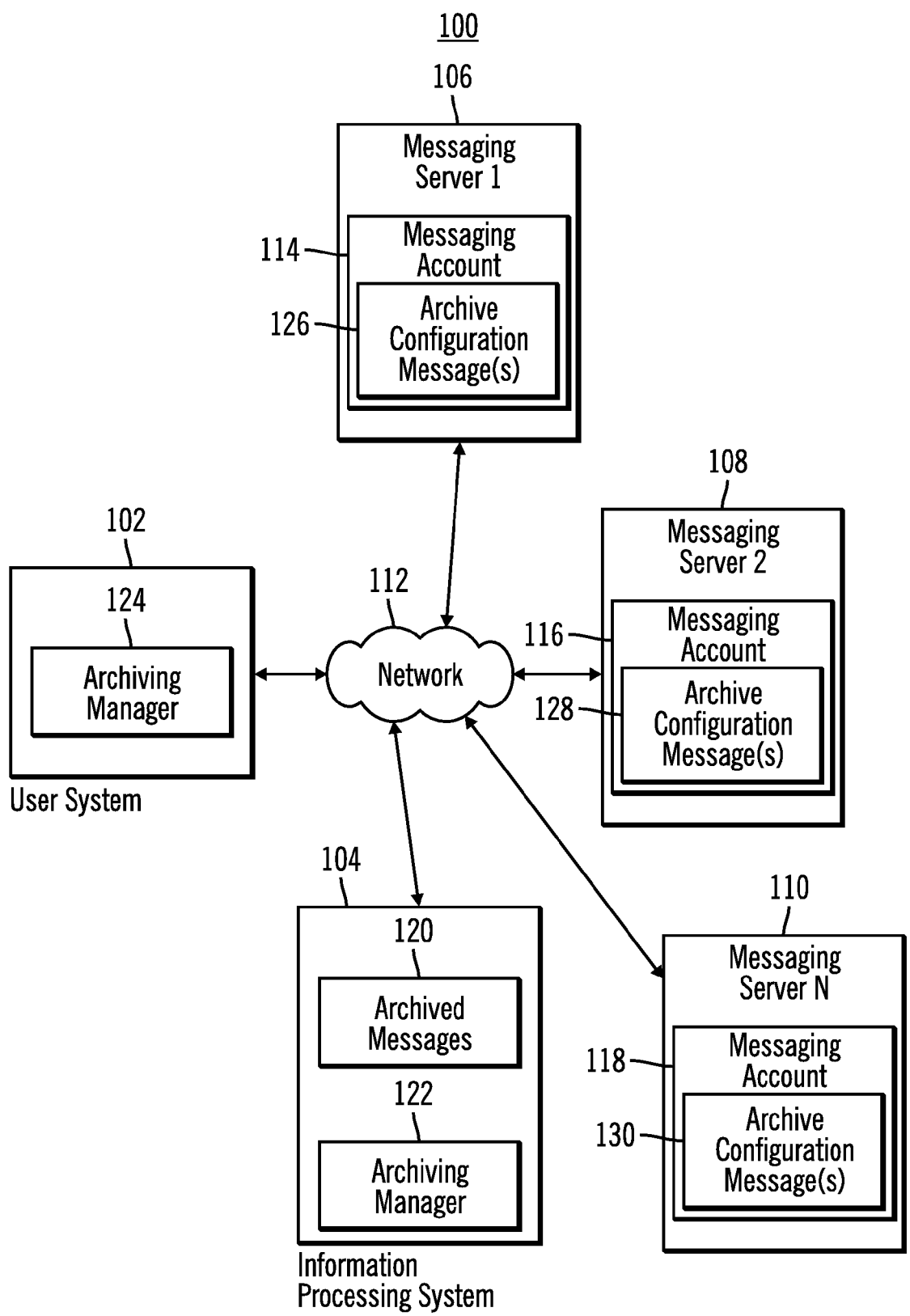
FIG. 1 is block diagram illustrating an exemplary system according to an embodiment of the present invention.

According to an embodiment of the present invention, as shown in FIG. 1, an exemplary system 100 is illustrated. FIG. 1 shows a system 100 comprising one or more user systems 102, an information processing system 104, and a plurality of messaging servers 106, 108, 110. In one embodiment, the system 100 is an archiving system for archiving a set of messaging accounts. A messaging account can be an email account, voicemail account, text messaging account, multimedia messaging account, and the like. It should be noted that even though following discussion is with respect to archiving email messages, the present invention is applicable to any type of messages.

The user system 102 is communicatively coupled to the information processing system 104, which from hereon in is referred to as the "archiving system 104", and the messaging servers 106, 108, 110 via a network 112. The network 112 according to one embodiment is a LAN, WAN, World Wide Web, wired, wireless network, or the like. A user can access one or more messaging accounts 114, 116, 118, which in this example are email accounts, either through a local client or via a web-interface. For example, the user can access a work email account, a personal email account such as Gmail™ by Google™ using a local client such as Microsoft® Outlook® or a web client provided by the email provider or a third party.

The archiving system 104, in one embodiment, archives messages such as emails associated with the user. For example, the archive system 104 communicates with each of the messaging servers 106, 108, 110 that the user has as an account on and archives one or more messages associated with the account. In one embodiment, the archiving system 104 stores the archived messages 120 on the system 104. It should be noted that even though the archiving system 104 is shown as a single system in FIG. 1, the archiving system can comprise multiple information processing systems. For example, one or more information processing systems can perform archiving operations and one or more different systems can be used to store the archived messages. Also, the archived messages 120 are not limited to residing on the system 104, the archived messages can reside on any system.

The archiving system 104 includes an archiving manager 122 for managing and performing archiving operations. In one embodiment, the user system 102 can comprise an archiving manager 124. In this embodiment, the user system 102 is also the archiving system. The archived messages can be stored locally on the user system 102 or on a remote system. In one embodiment, the archiving manager 122 archives messages by logging into the messaging accounts 114, 116, 118 on behalf of the user and searching for one or more archiving configuration messages or tags 126, 128, 130. An archiving configuration message/tag, in one embodiment, resides within a messaging account and comprises archiving instructions, policies, parameters, and the like.

For example, an archiving configuration message 126 for an email account can be an archiving configuration email. In this embodiment, the user sends an email including archiving instructions and parameters to the email account to be archived. Once the messages are archived the user can connect to the archive system 104 to search, view, and interact with the archived messages. If the original message needs to be placed back on the original messaging account it can be moved to the original messaging system folder. The archiving process and archiving configuration message are discussed in greater detail below.

Example of an Archiving Configuration Message

FIG. 2 shows one example of an archiving configuration message 226. The archiving configuration message 226 can include various fields and parameters for directing the archiving operation performed by the archiving manager 122. For example, FIG. 2 shows a "From" field 202 which is parsed by the archiving manager 122 to determine whether this particular message (e.g., email) is an archiving configuration message. In one embodiment, if the "From" field 202 indicates that this message 226 is from the user, the archiving manager 122 further analyzes the message 226 to determine whether the message 226 is a configuration message. In another embodiment, the user can send the archiving configuration message 226 via the archiving system 104. The "From" field 202, in this embodiment, indicates that the message 226 has been sent from the archiving system 104. The archiving manager 122 can then determine that this message 226 is an archiving configuration message.

The archiving configuration message 226 can also include a "Subject" field 204. The "Subject" field 204 can optionally include one or more words that the archiving manager 122 is to look for when archiving messages. For example, the "Subject" field 204 can include one or more keywords that indicates to the archiving manager 122 that this is an archiving message. It should be noted that this field is optional and the archiving message can include the one or more keywords within the message itself. An optional "Signature" field 206 can also be included in the archiving configuration message 226. The "Signature" field 206 includes a secure signature or certificate that indicates to the archiving manager 122 that the archiving configuration message 226 is valid.

The archiving configuration message 226 can also include A "Select" field 208. The "Select" field 208 indicates to the archiving manager 122 what messages or group of messages the archiving configuration message applies to 226. For example, if the archiving configuration message 226 is placed within an organizational object such as a folder, the "Select" field 208 can indicate that the archiving instructions within the archiving configuration message 226 are applicable only to the folder.

The "Select" field 208 can include any parameters for identifying a message or group of messages to be archived. For example, a date/range of dates, time/range of time, urgency, combination of folders, and the like can be used to indicate to the archiving manager 122 what messages to archive. The "Select" field 208 can also include a parameter that indicates to the archiving manager 122 to apply the archiving configuration message 226 to all messages in the message account. In one embodiment, the archiving manager 122 uses the "Subject" field 204 as a filter in conjunction with the "Select" field 208. For example, if the "Subject" field includes the keyword "IBM" and the "Select" field 208 indicates the archiving configuration message 226 applies to its folder only, the archiving manager 122 archives messages including "IBM" that are within that folder only.

An "Action" field 210 can also be included in the archiving configuration message 226. The "Action" field indicates to the archiving manager 122 an action that is to be applied to a message or group of messages. For example, the "Action" field 210 can indicate that archived messages be moved from their current folder to another specified folder at the same or different location. The "Action" field 210 can specify a particular remote storage location to move the archived messages to and whether the original message is to be deleted once the message is archived. The "Action" field 210, in other words, can include any archiving action that is to be performed on a message or group or messages. In one embodiment, if an action is not included in the "Action" field 210, the archiving manager 122 performs a predefined or default archiving action.

The archiving configuration message 226 can also include an optional "Duration" field 212. The "Duration" field indicates to the archiving manager 122 how long to retain the archived messages. An optional "Propagate" field 214 can indicate to the archiving manager 122 whether the archiving operation(s) defined by the archiving configuration is to be applied to any subfolders. For example, if the archiving configuration message 226 is within a top folder such as an "Inbox" folder that includes a subfolder "Work mail", the "Propagate" field 214 indicates whether the archiving configuration message 226 applies to messages in the "Inbox" folder alone or to the "Work mail" folder also. An optional "Override" field 216 indicates to the archiving manager 122 whether the configuration message 226 can be overridden by another archiving configuration message.

It should be noted that one or more of the fields discussed above may not be included within an archiving configuration message. Also one or more additional fields not discussed above can be included within the archiving configuration message 226. Furthermore, a messaging account 114 and/or folders within a messaging account 114 can include a plurality of archiving configuration messages. Each archiving configuration message can be associated within one or more folders or different sets of messages within the messaging account. Also, if a field within the archiving configuration message does not include an entry or a parameter then that particular field is ignored. Alternatively, a predefined or default entry/parameter can be applied by the archiving manager 122.

Example of a Folder Structure

Figure 3:
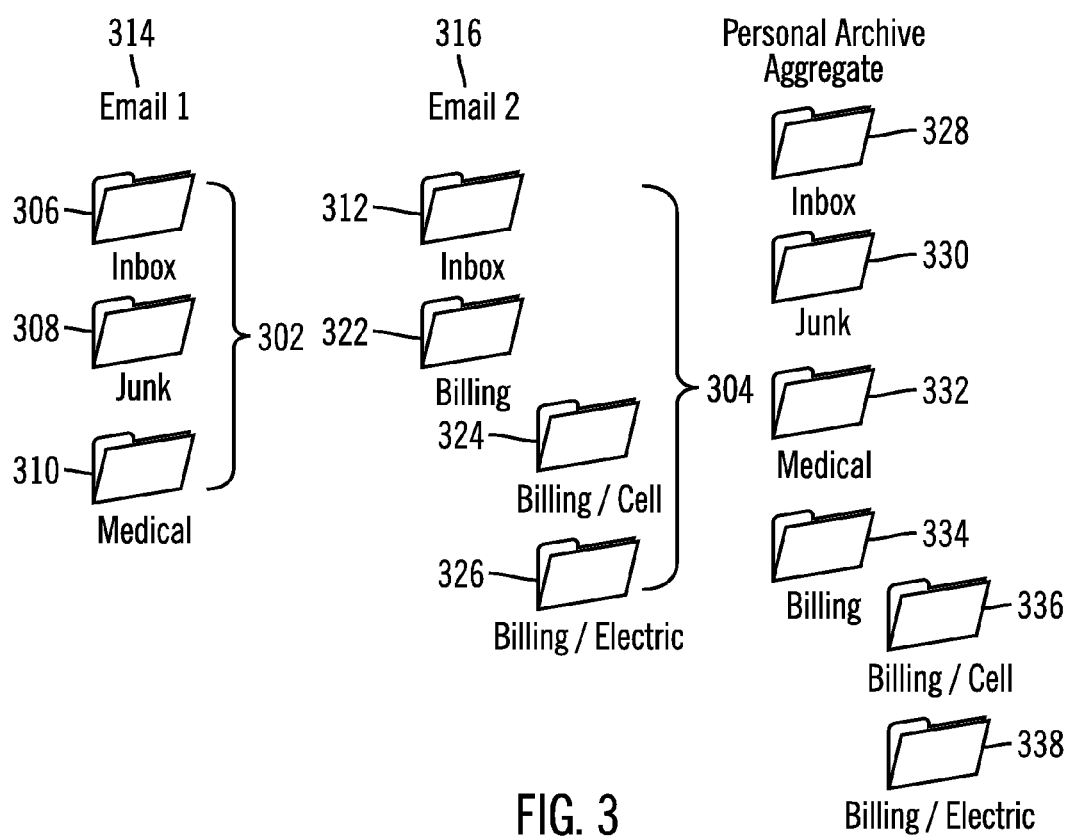
FIG. 3 illustrates various organizational objects used to organize and maintain messages in messaging accounts and an archiving system according to an embodiment of the present invention.

As discussed above, messaging accounts 114 can store messages within organizational objects such as folders. FIG. 3 shows one example of various folders used to organize messages. FIG. 3 shows a first set of folders 302 for a first email account 314 and a second set of folders 304 for a second email account 316. FIG. 3 also shows one example of a folder organizational structure on the archiving system 104. The first set of folders 302 includes three top folders, an "Inbox" folder 306, a "Junk" folder 308, and a "Medical" folder 310. Each of these folders includes one or more messages. The second set of folders 304 includes two top folders an "Inbox" folder 312 and a "Billing" folder 322, and two dependent folders, a "Billing/Cell" folder 324 and a "Billing/Electric" folder 326. In one embodiment, if a parent folder such as the "Billing" folder 322 includes an archiving configuration email, the archiving configuration within the parent folder is also applied to its children folders such as the "Billing/Cell" folder 324 and the "Billing/Electric" folder 326. However, the children folders can include an archiving configuration email that indicates it overrides any archiving configuration email in a parent folder. It should be noted that these are only examples and do not limit the present invention in any way.

In the example of FIG. 3, an archiving configuration message 126 can reside within any of the folders 306, 308, 310, 312, 322, 324, 324. If an archiving configuration message 126 resides within the "Inbox" folder 306, 312 of each messaging account 314, 316, a corresponding aggregated Inbox folder can reside on the archiving system 104. For example, FIG. 3 shows an aggregated "Inbox" folder 328 at the archiving system 104. This aggregated "Inbox" folder 328 can maintain archived messages from each of the "Inbox" folders on the messaging accounts 314, 316.

It should be noted that the archiving system 104 can also include a separate, i.e., non-aggregated, folder corresponding to each archived folder in the messaging accounts 314, 316. It should also be noted that "archiving" a folder can mean archiving an entire folder or archiving one or more messages within a folder. FIG. 3 also shows a "Junk" folder 330, a "Medical" folder 332, a "Billing" folder 334, a "Billing/Cell" folder 336, and a "Billing/Electric" folder 338. These folders correspond to the folders 308, 310, 322, 324, 326, respectively, residing in the messaging accounts 314, 316. In the example of FIG. 3, these folders have been created on the archiving system 104 because one or more messages in the corresponding folders in the messaging accounts 314, 316 have been archived.

It should be noted that the present invention is not limited to having folders at the archiving system that correspond to folders in the messaging accounts. Any organizational structure can be used for maintaining and organizing archived messages. Also, the archived messages are not limited to residing the information processing system(s) 104 comprising the archiving system. For example, the archiving system can be configured to store archived messages on any messaging account associated with the user or any other designated information processing system.

For example, a user may have a first messaging account that does not provide much storage space. However, the user has a second messaging account that provides virtually unlimited storage space. Therefore, the user wants to archive messages from one of the folders in the first account to a corresponding archive folder in the second account. The user sends an archiving configuration message or copies an existing archiving configuration message to the folder (i.e., the archiving folder) in the first account to be archived. When the archiving manager 122 parses through the folders/messages in the first account it identifies the archiving configuration message and archives the folder/messages accordingly. In this example, the archiving manager 122 archives the messages in the folder including the archiving configuration message in the first account to a corresponding folder in the second account.

As can be seen, the present invention allows a user to define an archive policy that moves mail from a messaging account such as an email account to an archive server (or an archive on the user system). The policy uses a set of criteria (and optionally rules) to determine which items to archive and what action to perform if any on the original message. For example, any high importance email, or any email from a particular sender can automatically be archived and kept in the email system; bank statements more 6 months old can be archived, but deleted from the original email folder; and mail with large attachments can be replaced with a stub containing a URL to the archived mail.

Also, the archive policy can either be located on the archive server 104 or in a particular message folder and used for all the messages in that folder. An archive policy for a particular folder can be defined by placing a configuration file in that message folder. However, the archive policy does not need to be stored on the archive server. By having a distributed archive configuration the user does not need to return to the archive server to change the archive policy.

Example of an Archiving Configuration Message Residing in a Messaging Account

Figure 4:
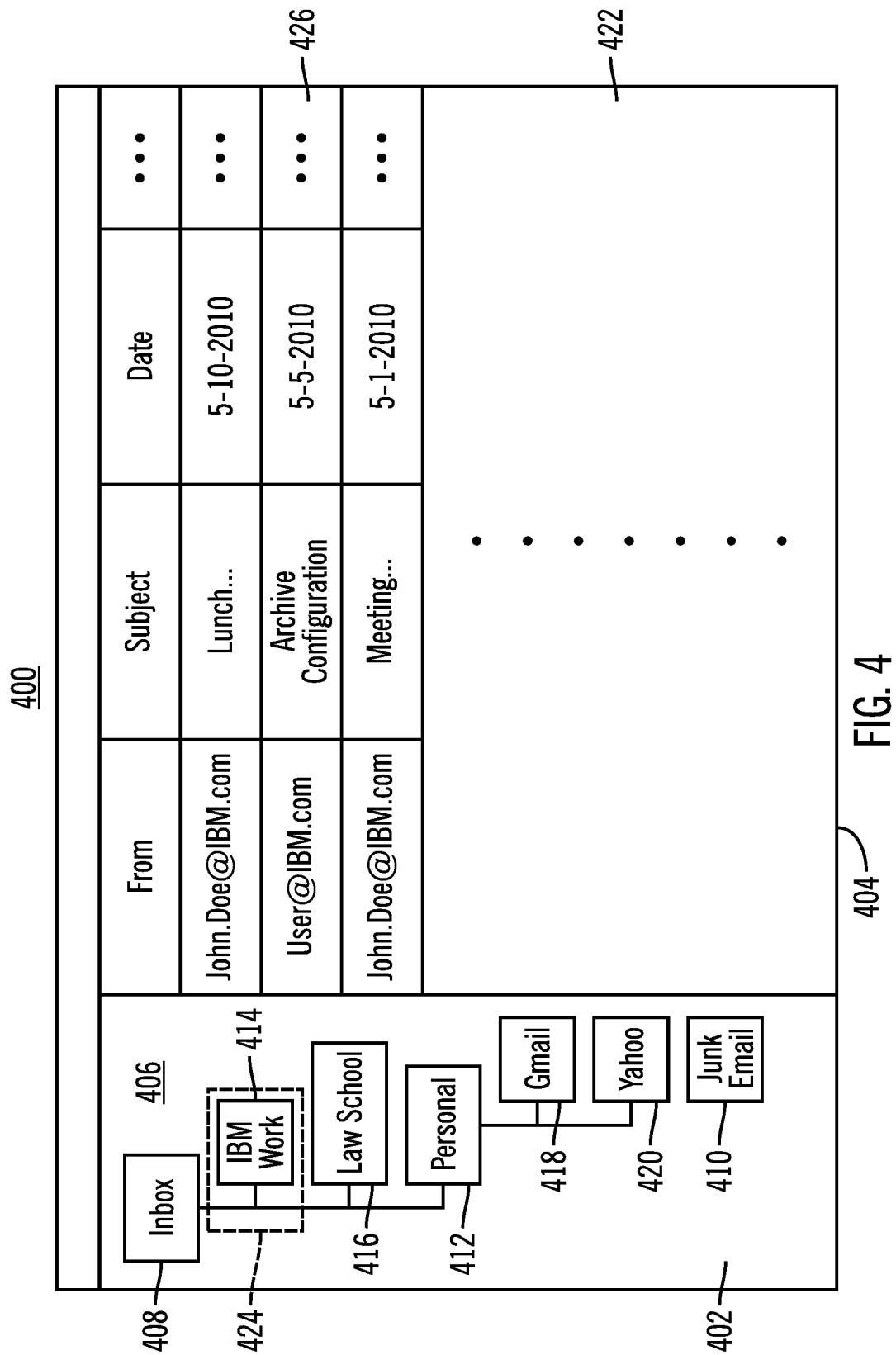
FIG. 4 illustrates a messaging client displaying an archiving configuration message residing in a messaging account according to an embodiment of the present invention.

FIG. 4 illustrates a messaging client 400 displaying an archiving configuration message 426 residing in a messaging account 414. The messaging client 400 in the example of FIG. 4 is an email client that can reside on the user system 102 or be a web-based client. In one portion 402 of the graphical user interface ("GUI") 404 a list of folders 406 is displayed to a user. Folders, as discussed above, are organizational objects that, in this example, organize messages such as emails.

FIG. 4 shows two top folders, an "Inbox" folder 408 and a "Junk Email" folder 410. The "Inbox" folder 408 comprises three dependent folders, an "IBM Work" folder 414, a "Law School" folder 416, and a "Personal" folder 412. The "Personal" folder 412 includes two dependent folders, a "Gmail" folder 418 and a "Yahoo" folder 420. The "IBM Work" folder 414, "Law School" folder 416, "Gmail" folder 418, and "Yahoo" folder 420 represent four separate and distinct messaging accounts. The email client 400 of FIG. 4 is an example where a single messaging client presents multiple messages from multiple messaging accounts to a user. However, the email client 400 can also be a web-based client as discussed above. In this example, a user may only have messages from the messaging account associated with the web-based client displayed. For example, the IBM Work messaging account may be associated with a web-based client that the user can access remotely. The IBM Work web-based client may only display messages from the IBM work messaging account to the user.

In one embodiment, the email client 400 includes a message display area 422 for displaying messages associated with a selected folder. For example, FIG. 4 shows that the "IBM Work" folder has been selected, as indicated by the dashed box 424. The display area 422 shows various messages from the IBM Work messaging account. As can be seen, an email 426 from the user@ibm.com with the subject "Archive Configuration" is shown. When the archiving manager 122 begins the archiving process, it parses through these emails and identifies the email from the user@ibm.com with the subject "Archive Configuration". This can indicate to the archiving manager 122 that the email 426 is an archiving configuration email.

It should be noted that the email address field, e.g. user@ibm.com and the "Subject" field of an email message are only a few examples of tags that the archiving manager 122 can look for when identifying an archiving configuration message. Also, the present invention is not limited to a user sending an archiving configuration message from the same account that is to be archived. For example, although FIG. 4 shows that the archiving configuration email 426 came from the user using the IBM Work messaging account, the user can send the archiving configuration email 426 from any messaging account. Also, the archiving system 104 can also provide a messaging account to the user for sending archiving configuration messages to accounts to be archived. It should also be noted that a new archiving configuration email does not need to be sent each time an archiving configuration is changed. For example, a user can edit an existing archiving configuration email.

One advantage of the present invention is that a flexible, user-friendly archiving system is provided to users. A user can easily configure the archiving of multiple messaging accounts without the need of an administrator to set an archiving policy and without the messaging interface being altered to include archival configuration information. The present invention is also advantageous because a user can simply send an archiving configuration message to the account(s) that the user wants archived. The archiving configuration message includes archiving instructions, rules, policies, and the like used by an archiving system to perform archiving operations. Many current archiving systems use templates, which are limited to a particular messaging system. However, with the present invention a user does not need to specify a particular messaging client or service to be archived; any messaging service can be used.

Exemplary Information Processing System

Figure 5:
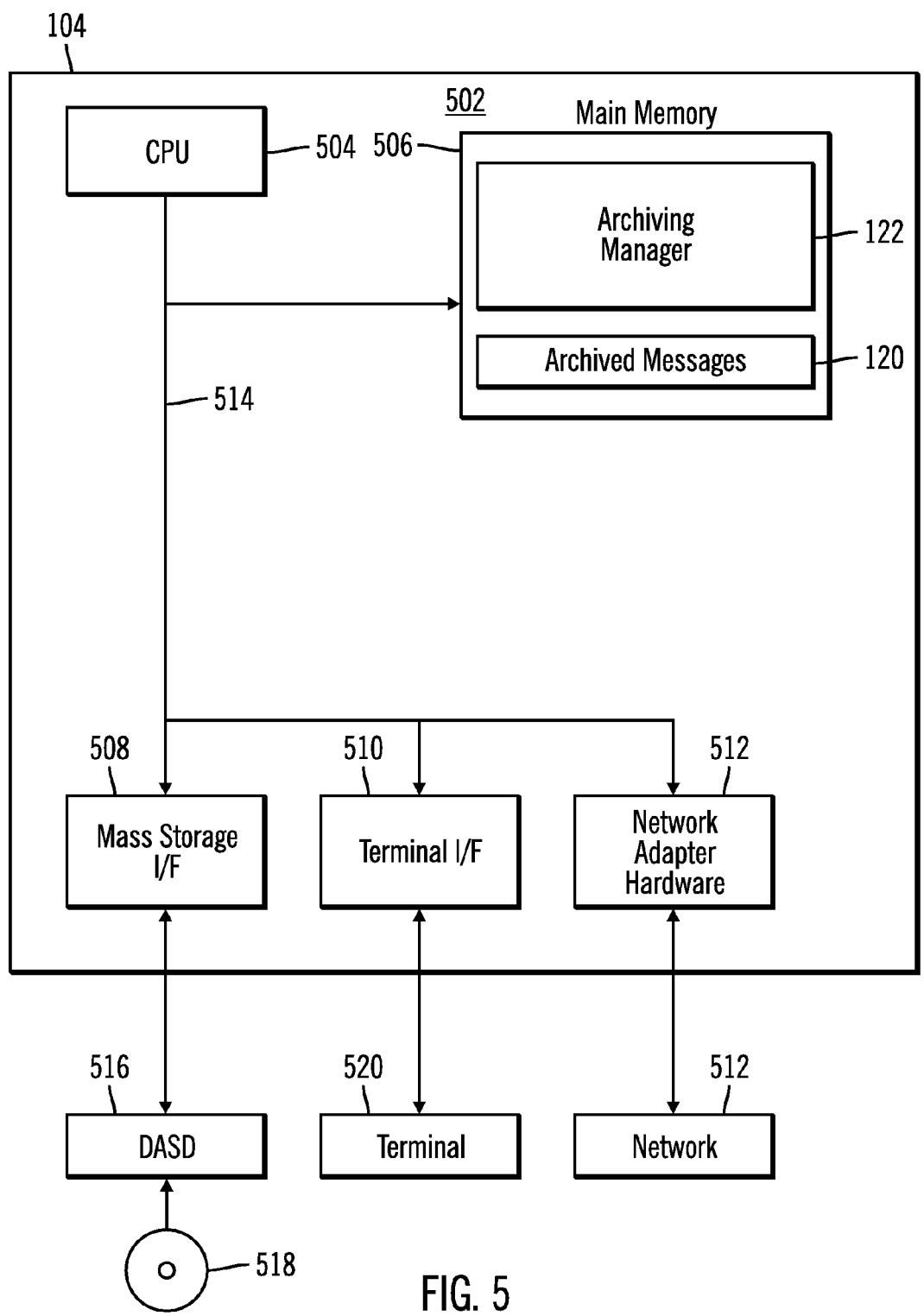
FIG. 5 is a block diagram illustrating a more detailed view of the archiving system according to an embodiment of the present invention.

FIG. 5 is a block diagram illustrating a more detailed view of the archiving system 104 according to an embodiment of the present invention. Although the following discussion is with respect to the archiving system 104, the discussion is also applicable to the user system 102 and the messaging servers 106, 108, 110.

The archiving system 104 is based upon a suitably configured processing system adapted to implement the exemplary embodiment of the present invention. Any suitably configured processing system is similarly able to be used as archiving system 104 by embodiments of the present invention, for example, a personal computer, workstation, or the like. The archiving system 104 includes a computer 502. The computer 502 has a processor 504 that is connected to a main memory 506, mass storage interface 508, terminal interface 510, and network adapter hardware 512. A system bus 514 interconnects these system components. Mass storage interface 508 is used to connect mass storage devices, such as data storage device 516, to the archiving system 104. One specific type of data storage device is a computer readable medium such as a Compact Disc or DVD drive, which may be used to store data to and read data from a CD 518 or DVD. Another type of data storage device is a data storage device configured to support NTFS type file system operations.

The main memory 506 includes the archiving manger 122 and the archived messages 120. As discussed above the archived messages 120 can reside on one or more information processing systems communicatively coupled to the archiving system 104. In one embodiment, the archiving system 104 utilizes conventional virtual addressing mechanisms to allow programs to behave as if they have access to a large, single storage entity, referred to herein as a computer system memory, instead of access to multiple, smaller storage entities such as the main memory 506 and data storage device

516. Note that the term "computer system memory" is used herein to generically refer to the entire virtual memory of the archiving system 104.

Although only one CPU 504 is illustrated for computer 502, computer systems with multiple CPUs can be used equally effectively. Embodiments of the present invention further incorporate interfaces that each includes separate, fully programmed microprocessors that are used to off-load processing from the CPU 504. Terminal interface 510 is used to directly connect one or more terminals 520 to computer 502 to provide a user interface to the archiving system 104. These terminals 520, which are able to be non-intelligent or fully programmable workstations, are used to allow system administrators and users to communicate with the server1 106. The terminal 520 is also able to consist of user interface and peripheral devices that are connected to computer 502 and controlled by terminal interface hardware included in the terminal I/F 510 that includes video adapters and interfaces for keyboards, pointing devices, and the like.

An operating system (not shown) included in the main memory is a suitable multitasking operating system such as the Linux, UNIX, Windows XP, and Windows Server 2003 of Microsoft Corporation of Redmond Wash. operating system. Embodiments of the present invention are able to use any other suitable operating system. Some embodiments of the present invention utilize architectures, such as an object oriented framework mechanism, that allows instructions of the components of operating system (not shown) to be executed on any processor located within the archiving system 104.

The network adapter hardware 512 is used to provide an interface to the network 112. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g., CD ROM 518, or other form of recordable media, or via any type of electronic transmission mechanism.

Process of Creating a User Account at the Archiving System

Figure 6:
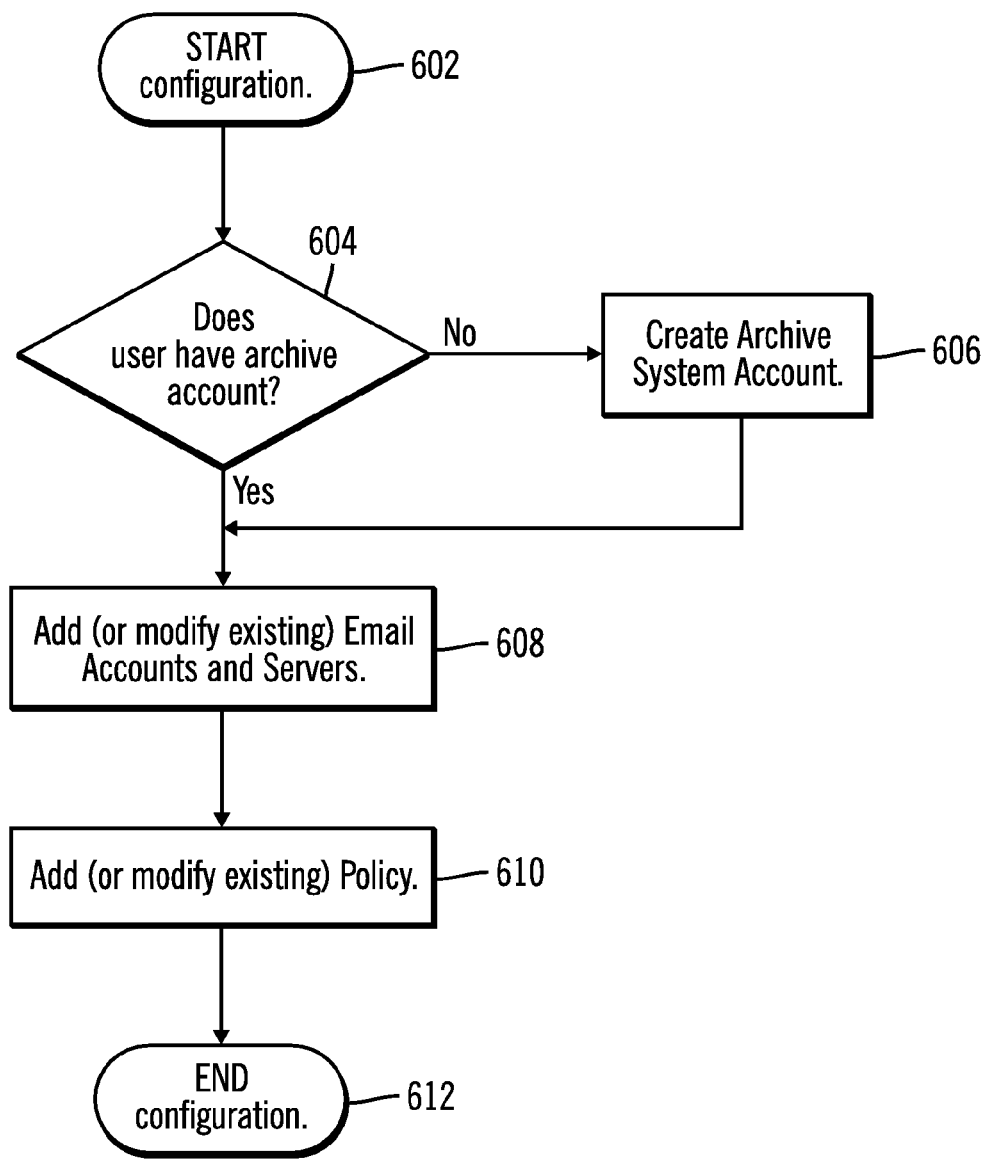
FIG. 6 is an operational flow diagram illustrating an exemplary process of creating a user account at the archiving system according to an embodiment of the present invention.

FIG. 6 is an operational flow diagram showing an exemplary process of creating a user account at the archiving system 104. This allows the user to access to the archiving system 104 and its functions. The operational flow diagram of FIG. 6 begins at step 602 and flows directly to step 604. The archiving manager 122, at step 604, determines if a user has an archive account. If the result of this determination is negative, the archive manager 122, at step 606, prompts the user to create an archive account. The control flows to step 608. If the result of this determination is positive. The user, at step 608, is allowed to add or modify existing message accounts and servers to be archived.

For example, a user can provide login credentials to the archiving system 104 so that the archive manager 122 can login to the accounts to be archived. It should be noted that the present invention is not limited to a user providing sensitive information such as a password to messaging accounts. A method can be employed that allows the archive manager 122 to log into messaging accounts without the user having to provide sensitive information to the archive system 104. The archive manager 122, at step 610, also allows the user to add new archiving configuration policies or modify existing policies. A user can also add or modify configuration messages from a local client such as a local messaging client or a web-based messaging client provided by a messaging service provider (e.g., the account to be archived). The control flow exits at step 612.

Process for Archiving Messages

Figure 7:
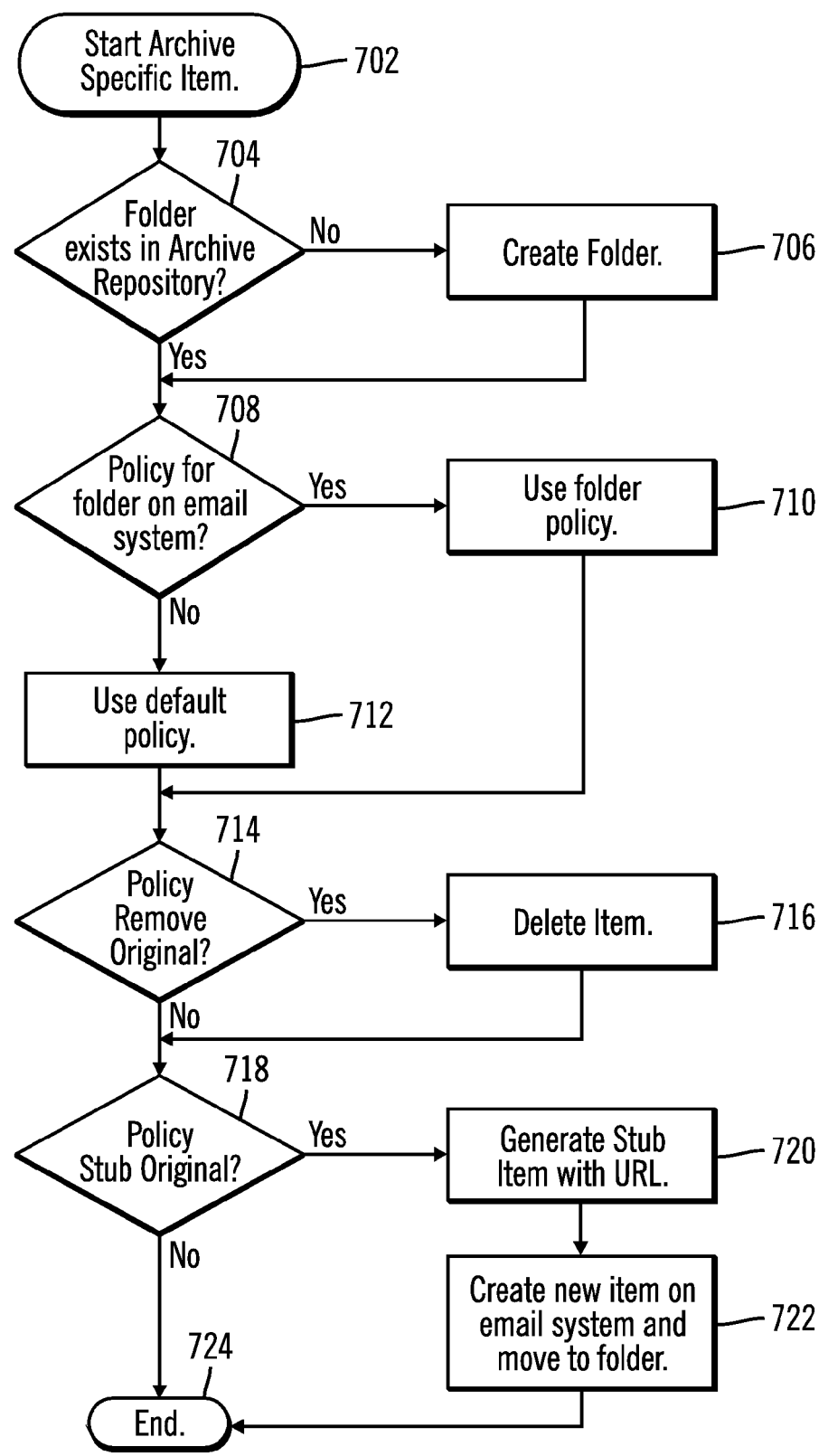
FIG. 7 is an operational flow diagram illustrating an exemplary process of archiving messages based on archiving configuration messages within messaging accounts to be archived according to an embodiment of the present invention.

FIG. 7 is an operational flow diagram showing a process of archiving messages based on archiving configuration messages within messaging accounts to be archived. The operational flow diagram of FIG. 7 begins at step 702 and flows directly to step 704. The flow of FIG. 7 starts after the archiving manager 122 determines that a folder in a messaging account includes one or more messages to be archived. This determination can be made, for example, by identifying an archiving configuration message 126 in the folder. The polling interval for archiving messaging accounts can be defined by a user or a default interval can be used.

The archiving manager 122, at step 704, determines if a folder exits in the archiving system 104 that corresponds to the folder to be archived. If the result of this determination is negative, the archiving manager 122, at step 706, creates a folder in the archiving system or in another system where archived messages are to be stored. The control then flows to step 708.

If the result of this determination is positive, the archiving manager 122, at step 708, determines if an archiving configuration message (policy) 126 has been identified within the folder. If the result of this determination is positive, the archiving manager 122, at step 710, uses the archiving configuration message (policy) 216 in the folder to archive the messages. The control then flows to step 714. If the result of this determination is negative and the user has tagged this folder to be archived, the archiving manage 122, at step 712, uses a default archiving policy to archive the messages.

The archiving manager 122, at step 714, determines if the archiving configuration message 126 indicates to remove the original message once archived. If the result of this determination is positive, the archiving manager 122, at step 716, deletes the original message from the messaging account. The control then flows to step 718. If the result of this determination is negative, the archiving manager 122, at step 718, determines if the archiving configuration message 126 indicates to stub the original message that has been archived. If the result of this determination is positive, the archiving manager 122, at step 720 generates a stub item that includes a link to the archived message and places this stub within the messaging account at step 722. The control flow then exits at step 724. If the result of the determination at step 718 is negative, the control flow exits at step 724.

Another Process for Archiving Messages

Figure 8:
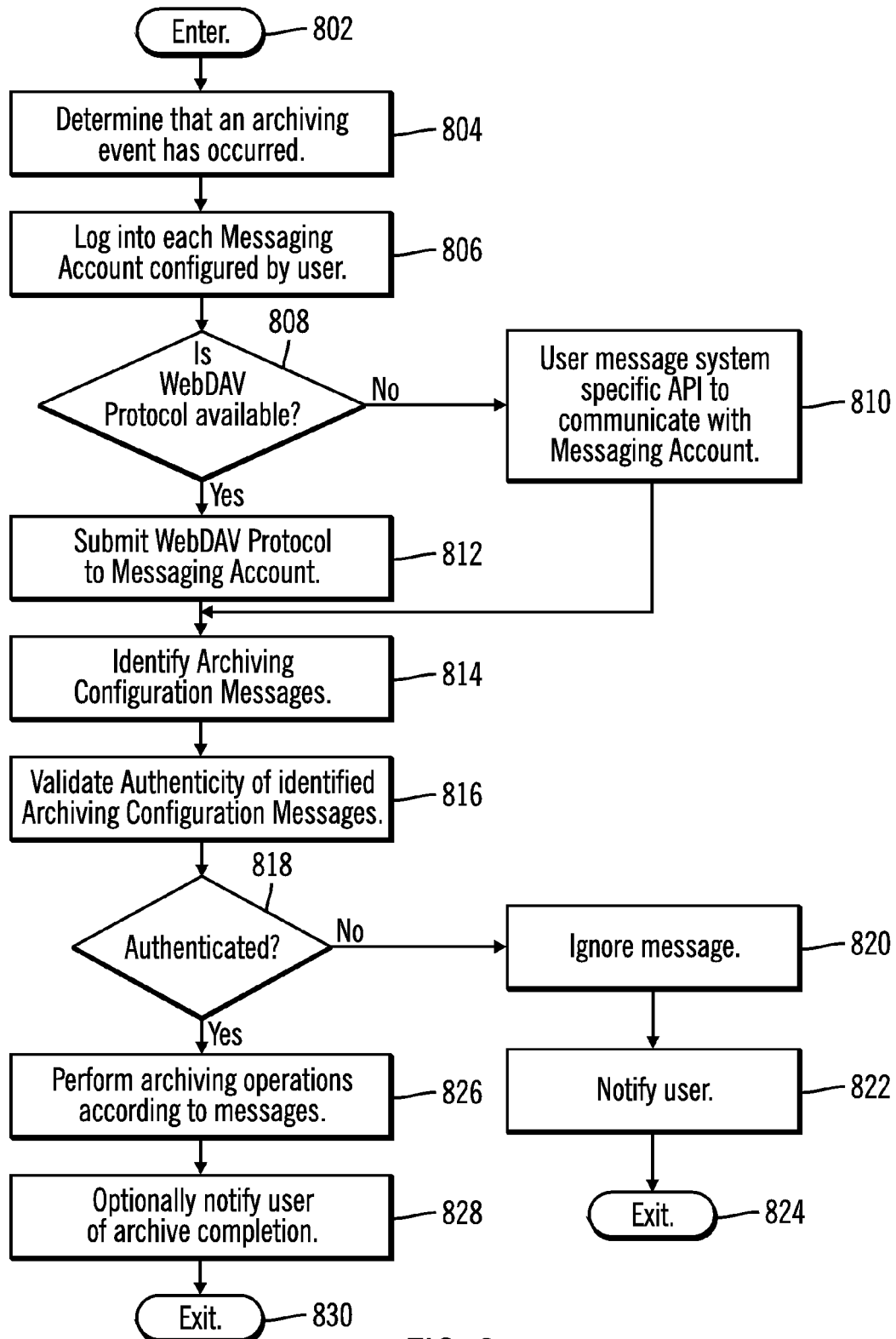
FIG. 8 is an operational flow diagram illustrating another process of archiving messages based on archiving configuration messages according to an embodiment of the present invention.

FIG. 8 is an operational flow diagram showing another process of archiving messages based on archiving configuration messages within messaging accounts to be archived. The operational flow diagram of FIG. 8 begins at step 802 and flows directly to step 804. The archive manager 122, at step 804, determines that an archiving event has occurred. For example, the archiving manager 122 can be configured to check an account for new messages to archive after a period of time has passed or detect when a user requests an archiving operation to be performed. In other words an archiving event is any event/action that causes the archiving manager 122 to perform archiving operations. The archiving manager 122, at step 806, logs into each messaging account configured by the user to be archived. The archiving manager 122, at step 808, determines if a Web-based Distributed Authoring and Versioning ("WebDAV") protocol is available for performing search, copy, move functions, and the like with the messaging account. If the result of this determination is negative, the archiving manager 122, at step 810, uses a messaging system specific API to communicate and perform functions with the messaging account. The control then flows to step 814. If the result of this determination is positive, the archiving manager 122, at step 812, submits a WebDAV protocol to the messaging account.

The archiving manager 122, at step 814, identifies any archiving configuration messages 126 within each messaging account. The authenticity of each archiving configuration message 126, at step 816, is verified and validated. The archiving manager 122, at step 818, determines if a current archiving configuration message is authentic. If the result of this determination is negative, that archiving manager 122, at step 820, ignores the archiving configuration message 126. The archiving manager 122, at step 822, notifies the user and the control flow exits at step 824. If the result of the determination at step 818 is positive, the archiving manager 122, at step 826, performs archiving operations in each account based on the identified and authenticated archiving configuration messages 126.

In one embodiment, as discussed above, the archiving operations can be hierarchical. For example, the archiving manager 122 determines if the folder that includes the archiving email message 126 is a child folder. If so, then configuration emails (if any) from the parent folders are combined with the configuration email 126 in the child folder. Alternatively, if the archiving manager 122 determines that the folder including the archiving email 126 is a parent folder, the configuration parameters are cascaded down to each child folder unless the children folders include an archiving configuration email that indicates it overrides a parent folder archiving configuration email. It should be noted that this hierarchical embodiment is only one example and does not limit the present invention in any way. The archiving manager 122, at step 828, optionally notifies the user of an archive completion. The control flow then exits at step 830.

An Additional Process for Archiving Messages

Figure 9:
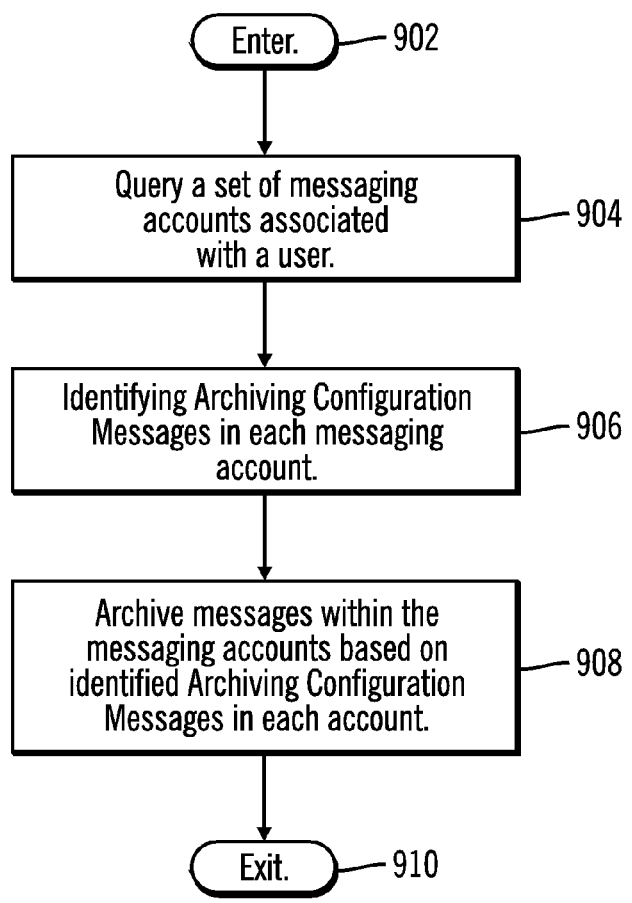
FIG. 9 is an operational flow diagram illustrating yet another process of archiving messages based on archiving configuration messages according to an embodiment of the present invention.

FIG. 9 is an operational flow diagram showing another process of archiving messages based on archiving configuration messages within messaging accounts to be archived. The operational flow diagram of FIG. 9 begins at step 902 and flows directly to step 904. The archiving manager 122, at step 904, queries a set of messaging accounts associated with a user. The archiving manager 122, at step 906, identifies a set of archiving configuration messages residing within at least one messaging account. The archiving manager 122, at step 908, archives messages within the messaging accounts based on one or more identified archiving configuration messages in each account. The control flow then exits at step 910.

Non-Limiting Examples

The foregoing embodiments of the present invention are advantageous because they provide user processes and represent system capabilities in a software package format allowing, among other things, information about versions of dependencies such as libraries that were used, run-time command options, and the like to be provided in a software package database. Also, describing system capabilities/resources in a software package format allows a software package to be extendable if a new capability is added and allows for a more complete specification of the hardware and software that the software was designed to run on. Additionally, the present invention allows for much finer-grained dependencies in the dependency resolution stage as opposed to runtime checks for capabilities during the install step.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Embodiments of the invention can be implemented as a program product for use with a computer system such as, for example, the computing environment shown in FIG. 1 and described herein. The program(s) of the program product defines functions of the embodiments (including the methods described herein) and can be contained on a variety of computer readable media. Illustrative computer readable medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such computer readable media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of archiving messages, the method on an information processing system comprising:
   initially, using a messaging account to send one or more archiving configuration messages to at least one messaging account
   wherein the least one messaging account comprises at least one of:
      a set of email accounts;
      a set of voice messaging accounts;
      a set of text messaging accounts; and
      a set of multimedia service accounts;
   querying the at least one messaging account associated with a user;
   identifying, in response to the querying, a set of archiving configuration messages residing within the at least one messaging account, wherein each archiving configuration message comprises separate and distinct archiving instructions for the at least one messaging account; and
   archiving at least one message in the messaging account based on an archiving configuration message associated with the message in the set of archiving configuration messages;
   wherein the archiving configuration message is an message residing in a messaging account, wherein the message comprises archiving instructions associated with a set of messages associated with the message account.

2. The method of claim 1, wherein the archiving instructions include at least one of:
   at least one archiving action instruction;
   a duration parameter for indicating how long the archiving configuration message is valid; and
   a retention parameter for indicating how long to retain archived messages.

3. The method of claim 1, wherein the archiving configuration message is located within a folder in the email account.

4. The method of claim 3, wherein the archiving instructions associated with the archiving configuration message only apply to emails residing within the folder.

5. The method of claim 1, further comprising:
   authenticating the archiving configuration message.

6. The method of claim 1, wherein the archiving further includes:
   determining that the archiving message resides within a parent folder in the messaging account including at least one child folder; and
   archiving at least one message in the parent folder and at least one message in the child folder based on the archiving message that resides within the parent folder.

7. The method of claim 6, wherein the archiving further includes:
   determining that the child folder includes an archiving message;
   determining when the archiving message in the child folder indicates that it overrides the archiving message within the parent folder;
   wherein when the archiving message in the child folder does indicates that it overrides the archiving message within the parent folder,
      archiving the at least one message in the child folder based only on the archiving message that resides within the child folder; and
   wherein when the archiving message in the child folder fails to indicates that it overrides the archiving message within the parent folder,
      archiving the at least one message in the child folder based on the archiving message that resides within the parent folder and the archiving message that resides in the child folder.

8. The method of claim 1, wherein the querying is in response to:
   logging in, on behalf of the user, to the set of messaging accounts using a set of log-in credentials associated with the user.

9. The method of claim 1, wherein at least one archiving configuration message comprises:
   an identification field comprising an identifier associated with the user.

10. The method of claim 1, wherein at least one archiving configuration message comprises:
    at least one keyword used for selecting the at least one message for archiving.

11. An information processing system for archiving messages the information processing system comprising:
    a memory;
    a processor that is communicatively coupled to the memory; and
    an archiving manager communicatively coupled to the memory and the processor, wherein the archiving manager is adapted to:
    initially, using a messaging account to send one or more archiving configuration messages to at least one messaging account
    wherein the least one messaging account comprises at least one of:
       a set of email accounts;
       a set of voice messaging accounts;
       a set of text messaging accounts; and
       a set of multimedia service accounts
    querying the at least one messaging account associated with a user;
       identifying, in response to the querying, a set of archiving configuration messages residing within at least one messaging account, wherein each archiving configuration message comprises separate and distinct archiving instructions for the messaging account; and
       archiving at least one message in the messaging account based on an archiving configuration message associated with the message in the set of archiving configuration messages;
    wherein the archiving configuration message is an message residing in a messaging account, wherein the message comprises archiving instructions associated with a set of messages associated with the message account.

12. The information processing system of claim of claim 11, wherein the archiving configuration message is located within a folder in the email account.

13. The information processing system of claim 12, wherein the archiving instructions associated with the archiving configuration message only apply to emails residing within the folder.

14. A tangible computer readable medium for archiving messages, the computer readable medium comprising instructions for:
   initially, using a messaging account to send one or more archiving configuration messages to at least one messaging account
   wherein the least one messaging account comprises at least one of:
      a set of email accounts;
      a set of voice messaging accounts;
      a set of text messaging accounts; and
      a set of multimedia service accounts
   querying the at least one messaging account associated with a user;
   identifying, in response to the querying, a set of archiving configuration messages residing within at least one messaging account in the set of messaging accounts, wherein each archiving configuration message comprises separate and distinct archiving instructions for the messaging account; and
   archiving at least one message in the messaging account based on an archiving configuration message associated with the message in the set of archiving configuration messages;
   wherein the archiving configuration message is an message residing in a messaging account, wherein the message comprises archiving instructions associated with a set of messages associated with the message account.

15. The tangible computer readable medium of claim 3, wherein the archiving configuration message is located within a folder in the email account.

16. The tangible computer readable medium of claim 15, wherein the archiving instructions associated with the archiving configuration message only apply to emails residing within the folder.

* * * * *